June 10, 1958
J. J. GORLINSKI
2,838,647
SHIELD FOR HEAT SEALER
Filed Aug. 27, 1956
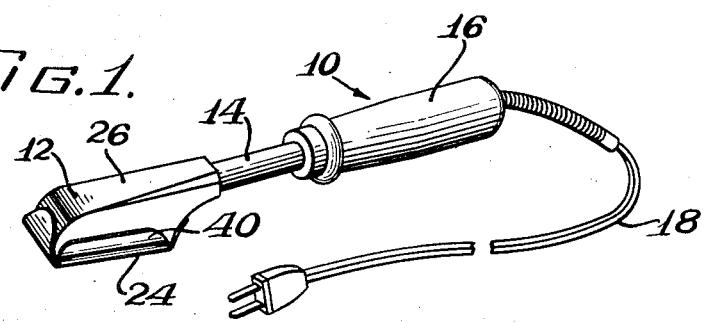
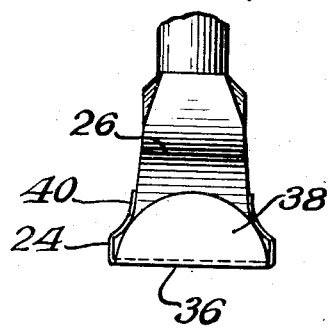
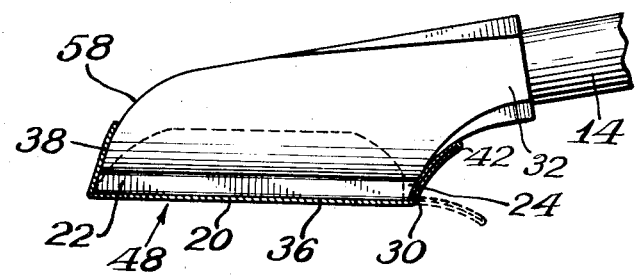
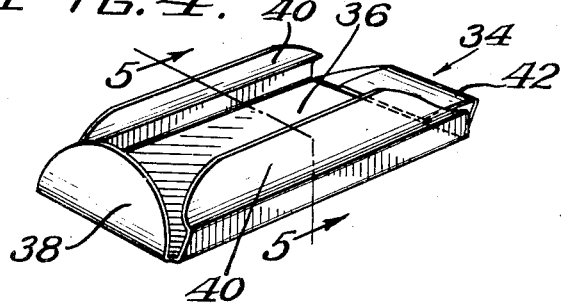
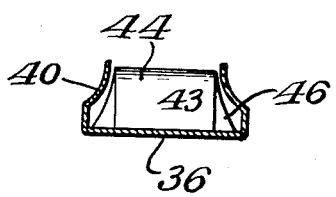
Inventor:
Joseph Gorlinski
By Horton, Davis, Brown & Bryman
Attys.

United States Patent Office 2,838,647
Patented June 10, 1958

2,838,647

SHIELD FOR HEAT SEALER

Joseph J. Gorlinski, Chicago, Ill., assignor to Casting Masters, Inc., Chicago, Ill., a corporation of Illinois Application August 27, 1956, Serial No. 606,390

5 Claims. (Cl. 219—21)

My invention relates to a shield for a heat sealer of the general type employed in sealing packages in plastic films.

The packaging of products in plastic films is of course commonplace. In order to seal a product within such a film, a sheet of a thermoplastic material such as cellophane, pliofilm, polyethylene, etc. is wrapped around the product or the product is encased in an envelope made of that material and a sealing iron is applied to the end of the envelope or to the overlapping edges of the plastic sheet which heats the plastic to a point of softening and fusion with the overlapped or adjoining portion of the plastic material. Mechanically, the sealing iron is very like an iron employed for pressing clothes or linens. It has a metal head which encloses a heating element, preferably thermostatically controlled, and has a highly polished sole to run along the plastic material and apply the heat thereto.

I have found that, while these irons are generally very satisfactory, they do have one serious detriment in that the plastic material being heated by them will occasionally stick to the sole, so obstructing the free sliding movement of the iron over the plastic. As the plastic remains on the sole, it burns and further roughens it; interferes with heat exchange; has an ever-increasing tendency to pick up more plastic, and do a ragged job of sealing. It is possible of course to scrape off the burnt-on plastic and reburnish the sole, but it is not practically feasible for the users of the sealing irons to achieve the same degree of finish on the sole that the manufacturer can. After such refinishing, therefore, the sole is somewhat rougher than it was in its factory-new condition, is more likely yet to pick some of the plastic material in use, and so require sooner a further reconditioning. Additionally, time is required for the reconditioning and duplicate tools must be furnished to replace those out of condition.

My invention lies in the provision of a smooth-surfaced, heat-conducting shield for the sole of the iron. It is my idea that the shield should be disposable so that if any plastic accumulate thereon, the shield may be readily stripped off and another applied. It should, of course, conduct heat well so as to obtain good heat transmission from the iron to the plastic material. It is desirable that it be so formed that it may be easily placed on the iron or removed therefrom without waiting for the iron to cool. It should of course be smooth and be as free as possible from the detriment of accumulating plastic. Finally, it should be inexpensive. My invention achieves all of these purposes.

I have noted a further beneficial effect from the use of my shield, in that there is a temperature differential over the face of the shield so that the region underlying the sole of the iron is substantially hotter than the sole when used without the shield. Since the greater heat obtained by use of the shield results in the plastic material being sealed more rapidly, and more perfectly, this is a highly desirable characteristic.

Other objects and advantages of my invention will be apparent from the following description and drawings, of which:

Fig. 1 is a perspective view of a heat sealer or sealing iron with a shield embodying my invention secured thereto;

Fig. 2 is a front elevation of the head of the iron illustrated in Fig. 1;

Fig. 3 is a side elevation thereof;

Fig. 4 is a perspective of the shield of my invention as separate from the sealing iron; and, Fig. 5 is a sectional view taken substantially along the line 5—5 of Fig. 4 looking in the direction of the arrows.

The sealing iron 10 illustrated in Fig. 1 has a head 12 mounted by means of a shaft 14 to a handle 16. A cord 18 extends from the handle for attachment to an electrical outlet. The cord extends through the handle 16 and shaft 14 to a heating element inside the head 12 whereby the head is heated. Thermostatic control (not shown) may be provided to adjust the degree of heating of the head.

The head 12 has a highly polished, flat, pressing surface or sole 20 which may be rectangular or slightly trapezoidal, being possibly somewhat narrower toward the toe end 22 of the sole. The side edges of the casting which constitute the head 12 extend upwardly a short distance and then curve inwardly to define flanges 24 along the longitudinal edge of the sole. Thereafter, the metal extends upwardly once more to the transverse top 26 of the casting. The toe end of the iron curves downwardly as at 28 from the transverse top 26 to meet the toe end of the sole at an acute angle. The heel end 30 of the casting breaks sharply upward at an obtuse angle to the sole and curves toward the horizontal to form a socket 32 for the shaft 14.

The shield 34 of my invention is formed desirably of heavy aluminum foil. Other metallic materials are of course conceivable and within the purview of my invention, but aluminum is particularly well suited to my purposes by virtue of its excellent heat conductivity, its workability, its smoothness in foil form, its freedom from corrosion and its flexibility. The shield 34 comprises essentially a base portion 36 which is proportioned to be substantially identical with the sole 20 of the iron 10 to fit as accurately as possible against the sole.

At the toe end, the shield has an arcuate tab 38 thereon bent back at an acute angle to the base 36 to lie flat against the toe end of the iron when the sole of the iron lies against the base 36. The side or longitudinal edges of the base portion have brackets 40 formed thereon which amount to tabs on the edges bent to conform to the lower side surfaces of the head 12. The brackets thus extend upward and then curve inwardly and upward to embrace the flanges 24 and overlie partially the sides of the head above the flanges.

At the rear edge of the base portion is a fourth tab 42 whose side edges are formed to conform roughly with the back surface of the head 12 upward of the heel 30 of the sole. It will be noted that this surface is downwardly concave. The fourth tab 42 or grip is likewise concave downwardly, but instead of being bent upwardly into the ironing head engaging conformation as are the previously described three tabs, the grip extends outwardly from the base 36 and curves slightly downwardly therefrom. In order to assure a good grasp of the grip 42, the metal defining it may be made doubly long, and half of the metal 44 be bent back over on top of the other half 46 to give greater strength and thickness.

The use of my shield will be readily apparent from the foregoing description. When a shield has become fouled by the deposit or accumulation of plastic material thereon, as for example in the area indicated by the arrow 48 (Fig. 3), the grip 42 may be easily flicked away from the head surface adjacent the heel of the sole by the use of a fingernail or any appropriate simple tool. With a quick seizure and tearing, the shield can be quickly stripped off the head, probably by hand. Aluminum foil is soft and flexible and the bracket sides 40 will easily spread and the shield pull easily off. Should the grip tab 42 be too hot for direct manual manipulation, a pair of pliers will serve as well.

To install another shield, one of a supply may be picked up by the fingers, grasping the grip tab 42, the shield be drawn over the toe end of the head 12, and the grip tab pressed quickly against its associated surface above the heel.

I have not been able to account positively for the differential in heating over the surface of the base 36 of the shield 34 as compared with the heat of the sole 20, when no shield is used. As a pragmatic matter, the shield 34 does heat to a higher level than that reached by the sole of the iron without a shield. I suggest possibly that the reflective characteristics of the shield itself may cause a greater build-up of heat in the sole of the iron before full heat transfer to the shield is effected.

It will be appreciated that my invention described here is capable of many applications to different tools, and alternatives both as to material and structure are likewise conceivable. I, therefore, prefer that my invention be regarded as being limited only as set forth in the following claims.

I claim:

1. A sealing iron shield comprising a piece of relatively stiff metal foil having a base portion equal in size to the sole of the iron, upwardly bent tabs on three sides of said base portion formed to engage in securing relation the three corresponding sides of said iron upwardly of said sole, and an outwardly extending tab on the fourth side of said base adapted to be bent upwardly against the fourth side of said iron upwardly of said sole when said base is seated against said sole with said three tabs against their respective sides.

2. A shield for a heated iron comprising a piece of relatively stiff metal foil having a base portion equal to the sole of said iron, upwardly bent tabs on the margin of all but one of the sides of said base portion formed to engage the sides of said iron other than the side corresponding to said one side of said base portion in securing relation, and an outwardly extending tab on said one side of said base adapted to be bent upwardly against the corresponding side of said iron upwardly of said sole when said base is seated against said sole with said upwardly bent tabs against their respective sides.

3. A shield for a sealing iron of the type having two opposite sides generally upwardly convergent from the sole thereof, comprising a piece of relatively stiff aluminum foil having a base portion identical with the sole of said iron, upwardly convergent tabs on the margins of said base portion corresponding to said two opposite sides of said iron to make said iron insertable in said shield between said tabs with said base portion against said sole, tab means at one end of said shield to intercept a third side of said iron to limit the insertion of said iron into said shield and a normally outwardly and downwardly extending tab at the other end of said shield adapted to be bent upwardly against the fourth side of said iron to secure said shield to said iron.

4. A shield for a sealing iron of the type having a heated head with lateral flanges thereon to broaden the sole surface thereof comprising a piece of relatively stiff metal foil including a base portion identical to the sole of said iron, lateral tabs on the edges of said base portion bent upwardly and inwardly to embrace said flanges of said head, an upwardly bent tab to engage the side of the iron upwardly of the toe portion of the sole thereof, and a tab on the heel edge of said base portion extending normally outwardly and downwardly therefrom and bendable up against the side of the iron adjacent the heel portion of the sole thereof.

5. The combination as set forth in claim 4 in which said last tab is folded back on itself to define a tab of double thickness.

References Cited in the file of this patent

UNITED STATES PATENTS

| Re. 23,736 | Helmbold | Nov. 17, 1953 |
| 2,236,992 | Broadley | Apr. 1, 1941 |
| 2,424,558 | Delano | July 29, 1947 |
| 2,535,171 | Sundstrom | Dec. 26, 1950 |
| 2,724,041 | Anton | Nov. 15, 1955 |